United States Patent
Korkowski et al.

(10) Patent No.: US 6,754,045 B2
(45) Date of Patent: Jun. 22, 2004

(54) ELECTRICAL INTERCONNECT WITH A RETAINING FEATURE FOR AN ACTUATOR ASSEMBLY

(75) Inventors: Kurt James Korkowski, Carver, MN (US); Michael Glenn Seliger, Champlin, MN (US); Gordon Alan Harwood, Prior Lake, MN (US); Dan Jon Petersen, Plymouth, MN (US)

(73) Assignee: Seagate Tech. LLC, Scotts Valley, CA (US)

( * ) Notice: Subject to any disclaimer, the term of this patent is extended or adjusted under 35 U.S.C. 154(b) by 33 days.

(21) Appl. No.: 10/147,670

(22) Filed: May 16, 2002

(65) Prior Publication Data

US 2003/0123194 A1 Jul. 3, 2003

Related U.S. Application Data

(60) Provisional application No. 60/345,272, filed on Jan. 3, 2002.

(51) Int. Cl.[7] .................................................. G11B 5/48
(52) U.S. Cl. .................................. 360/245.9; 360/264.2
(58) Field of Search .......................... 360/245.9, 264.2, 360/265.7, 266.3

(56) References Cited

U.S. PATENT DOCUMENTS

| 5,677,815 A | 10/1997 | Chan |
| 5,691,861 A | 11/1997 | Ohba |
| 5,831,788 A | 11/1998 | Hofland |
| 6,018,439 A | 1/2000 | Forbord et al. |
| 6,046,886 A | * 4/2000 | Himes et al. ............ 360/245.9 |

FOREIGN PATENT DOCUMENTS

| EP | 0 432 145 A2 | 6/1991 | |
| GB | 2 280 060 A | 1/1995 | |
| JP | 03272014 A | * 12/1991 | ............ G11B/5/60 |
| JP | 09161251 A | * 6/1997 | ............ G11B/5/60 |

* cited by examiner

*Primary Examiner*—William Klimowicz
(74) *Attorney, Agent, or Firm*—Jennifer M. Buenzow

(57) ABSTRACT

An interconnect apparatus for connecting a transducer to a flexible connector in an actuator assembly of a data storage device. The actuator assembly has a moveable actuator body and an arm extending from the body. The body defines a longitudinal opening aligned with the arm and associated with the placement of the interconnect apparatus. The interconnect apparatus includes a proximal end fixed to the actuator body and electrically connected to the flexible connector; a distal end fixed to the arm and electrically connected to the transducer; a medial portion electrically connecting the ends, a segment of the medial portion disposed within the actuator body opening; and a retaining member interposed between the medial portion and the actuator body within the opening, fixing the medial portion to the actuator body without using a bonding material.

23 Claims, 6 Drawing Sheets

ELECTRICAL INTERCONNECT WITH A RETAINING FEATURE FOR AN ACTUATOR ASSEMBLY

CROSS REFERENCE TO RELATED APPLICATIONS

This application claims the benefit of U.S. Provisional Application No. 60/345,272. Filed on Jan. 3, 2002.

FIELD OF THE INVENTION

This invention relates generally to the field of data storage devices and more particularly but without limitation to flexible ribbon cable interconnect apparatuses in an actuator assembly.

BACKGROUND OF THE INVENTION

Modern data storage devices such as disc drives are commonly used in a multitude of computer environments to store large amounts of data in a form that is readily available to a user. Generally, a disc drive has a magnetic disc, or two or more stacked magnetic discs, that are rotated by a motor at high speeds. Each disc has a data storage medium comprising a surface divided into a series of generally concentric data tracks where data is stored in the form of magnetic flux transitions.

A data transfer member such as a transducer is moved by an actuator assembly to selected positions adjacent the data storage surface. The active elements of the transducer are supported by suspension structures (or "flexures") of the actuator assembly. The active elements are maintained a small distance away from the data storage surface as the transducer flies upon an air bearing generated by air currents caused by the spinning discs.

Each transducer is typically provided with separate read and write elements, with a common configuration utilizing a thin film, inductive write element and a magneto-resistive (MR) read element. Data are written by passing a write current through the write element, with the write current generating a time-varying magnetic field which accordingly magnetizes the disc surface. Previously written data are read using the read element to transduce the selective magnetization of the disc to generate a read signal which is received by a read channel to reconstruct the data.

The actuator assembly operates within a negative feedback, closed-loop servo system. In this manner, the actuator moves the transducer radially over the disc surface for track seek operations and holds the transducer directly over a track on the disc surface for track following operations. A servo controller samples the position of the transducers relative to some reference point and generates an error signal based upon the difference between the actual position and the reference position. This error signal is then used to drive the transducer to the desired reference point, typically by demanding a current through a voice coil motor (VCM) which forms a part of the actuator assembly.

Typically, the control electronics are situated in a circuit board attached to the device enclosure. A flexible connector electrically connects the actuator assembly to the circuit board in a manner permitting the movement of the actuator body, or e-block, between the innermost and outermost data tracks. One type of flexible connector is a looped ribbon cable that is fashioned to expand and contract as the e-block moves substantially without resistance on the actuator assembly.

Ribbon cable type electrical interconnects are recently replacing the prior use of small wires connecting the transducer to the flexible connector. In a preferred solution, a longitudinal opening is defined in the e-block that is aligned with a lateral face of one of the actuator arms. One end of the interconnect is fixed to the actuator body and electrically connected to the flexible connector. The other end of the interconnect is fixed to the arm and electrically connected to the transducer. A medial portion electrically connects the ends, and a segment of the medial portion is receivingly engaged within the e-block opening for constraint.

A potential problem exists with the interconnect medial portion being loosely constrained within the e-block opening. Namely, air currents passing over the e-block can impart forces creating vibration in the interconnect medial portion. These vibrations can result in nonrepeatable runnout (NRRO) errors in the data reading and writing procedures.

One proposed solution involves using a bonding material, such as an adhesive or an epoxy, to fix the interconnect medial portion to the e-block within the opening. Although effective in reducing vibrations, using a bonding material necessarily involves employing complex and problematic manufacturing procedures.

On the other hand, it has been determined that a retaining member can be utilized cooperatively with the interconnect to wedgingly engage the interconnect medial portion within the e-block opening. The retaining member can be a feature of the interconnect, such as a tab juxtaposed adjacent one edge of the medial portion and foldable toward the medial portion. The tab and medial portion cooperate to define a resiliently compressible member that is attachable in the e-block opening. It is to these improvements and others as exemplified by the description and appended claims that embodiments of the present invention are directed.

SUMMARY OF THE INVENTION

Embodiments of the present invention are directed to an interconnect apparatus for connecting a transducer to a flexible connector in an actuator assembly of a data storage device. The actuator assembly has a moveable actuator body, or "e-block," and an arm extending from the body. The body defines a longitudinal opening aligned with the arm and associated with the placement of the interconnect apparatus. The interconnect apparatus comprises a proximal end fixable to the actuator body and electrically connectable to the flexible connector; a distal end fixable to the arm and electrically connectable to the transducer; a medial portion electrically connecting the ends, a segment of the medial portion disposable within the actuator body opening; and a retaining member interposable between the medial portion and the actuator body within the opening, adapted for fixing the medial portion to the actuator body without using a bonding material.

In one illustrative embodiment the retaining member comprises a tab juxtaposed adjacent the medial portion and operably foldable toward the medial portion. Accordingly, the folded tab and medial portion generally define a cross-sectional shape characterized by a resilient compressible member receivingly engageable within the opening. Preferably, the folded tab and medial portion define a compressible member wedgingly engageable within the opening.

In one illustrative embodiment the actuator assembly has two arms extending from the actuator body, wherein a first interconnect apparatus is attachable to one of the arms and a second interconnect apparatus is attachable to the other arm. Both interconnect apparatuses pass through the same opening in the actuator body. The respective tabs can be clearingly longitudinally staggered so as to prevent an overlapping engagement therebetween. In one illustrative embodiment each of the tabs is receivingly engageable between the interconnect apparatuses. The tab can be attached at one edge to the interconnect apparatus medial portion; alternatively, the tab can be unitarily formed as a portion of the interconnect apparatus.

In one aspect of the embodiments of the present invention an actuator assembly for a data storage device is contemplated. The actuator assembly comprises a moveable actuator body comprising an arm extending from the body; a transducer supported by the arm to read data from and write data to a data storage medium of the data storage device; a flexible connector connecting a printed circuit board of the data storage device and contact terminals supported by the actuator body; and an interconnect apparatus electrically connecting the transducer and the flexible connector, wherein the actuator body defines a longitudinal opening aligned with the arm and associated with the placement of the interconnect apparatus.

The interconnect apparatus comprises a proximal end fixed to the actuator body and electrically connected to the flexible connector; a distal end fixed to the arm and electrically connected to the transducer; a medial portion electrically connecting the ends, a segment of the medial portion disposed within the actuator body opening; and a retaining member interposed between the medial portion and the actuator body within the opening, fixing the medial portion to the actuator body without using a bonding material.

In one aspect of the embodiments of the present invention a data storage device is contemplated, comprising an actuator assembly operably coupled with a data storage medium in a data reading and writing relationship; and means for reducing vibration by fixing a medial portion of an electrical interconnect to the actuator assembly without using a bonding material.

These and various other features as well as advantages which characterize the present invention will be apparent upon a reading of the following detailed description and review of the associated drawings.

DETAILED DESCRIPTION

Figure 1:
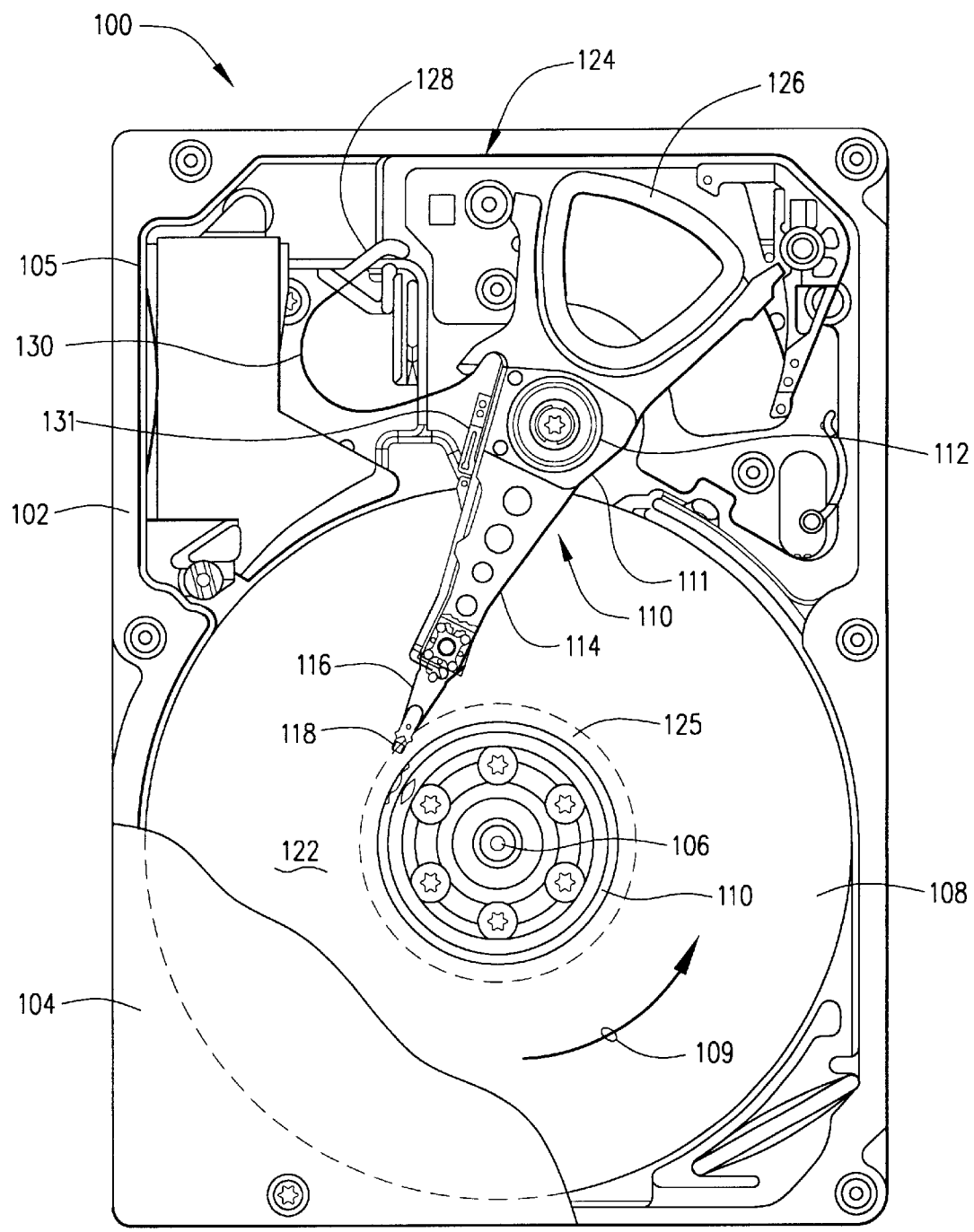
FIG. 1 is a plan view of a data storage device constructed in accordance with an embodiment of the present invention.

FIG. 1 provides a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive 100.

A spindle motor 106 rotates a plurality of magnetic recording discs 108 at a constant high speed in a direction denoted by arrow 109. User data are written to and read from tracks on the discs 108 through the use of an actuator assembly 110, which rotates about a bearing shaft assembly 112 adjacent the discs 108. The actuator assembly 110 includes a plurality of rigid actuator arms 114 which support flexible suspension assemblies ("flexures") 116. A read/write head ("head") 118 is supported at the end of each flexure 116 to interface with the corresponding disc surfaces.

A voice coil motor (VCM) 124 controls the position of the heads 118 through application of a current, or "driving energy," to a coil 126 which interacts with a magnetic circuit. When the disc drive 100 is not in use, the heads 118 can be parked on landing zones 125 and the actuator assembly 110 can be secured using a magnetic latch assembly.

Electrical signals for reading data from and writing data to the disc 118 are transmitted between the head 118 and a disc drive printed circuit board (PCB) which is typically mounted to the base deck 102. The PCB comprises control circuitry that controls the disc drive 100 operation. An electrical connector 128 connects to the PCB and communicates with the enclosure interior. A flexible connector 130 is connected to the electrical connector 128 and defines a moveable loop of flexible printed circuit ribbon material that flexes in response to actuator assembly 110 movement. The distal end of the flexible connector 130 is supported by the moveable central body 111 of the actuator assembly 110 (sometimes referred to the as the "e-block 111"). For example, in one illustrative embodiment a read preamplifier 131 is attached to the e-block 111 and the flexible connector 130 connects the PCB to the preamplifier 131.

Figure 2:
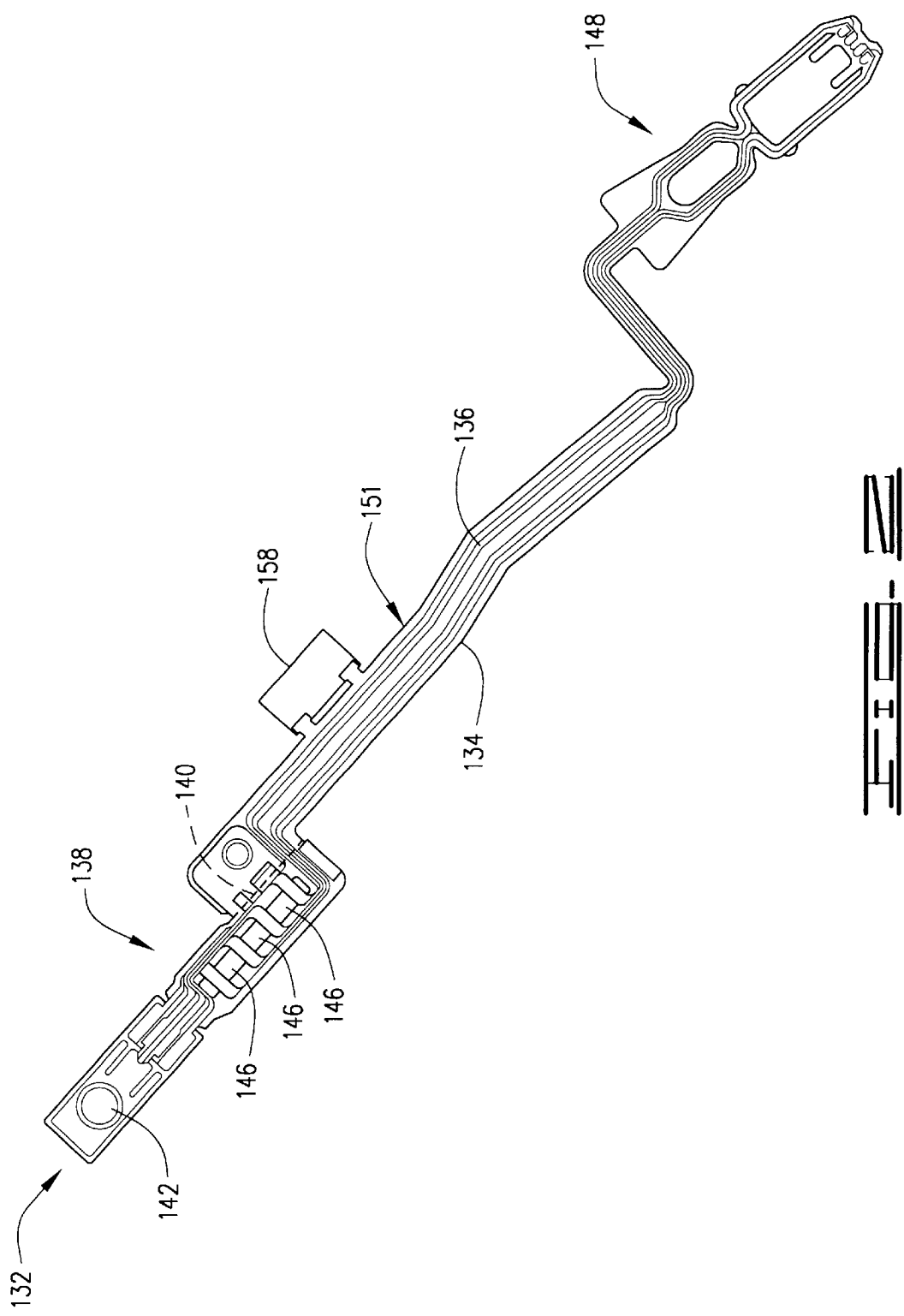
FIG. 2 is a plan view of the electrical interconnect apparatus of FIG. 1 in an unfolded state.

An interconnect apparatus 132 electrically connects the head 118 to the flexible connector 130. FIG. 2 is a plan view of the interconnect 132 in a flat form as it is manufactured as a flexible printed circuit ribbon cable. A dielectric material 134 supports a plurality of electrically conductive traces 136 and an overcoating material (not shown) insulates the traces 136.

Figure 3:
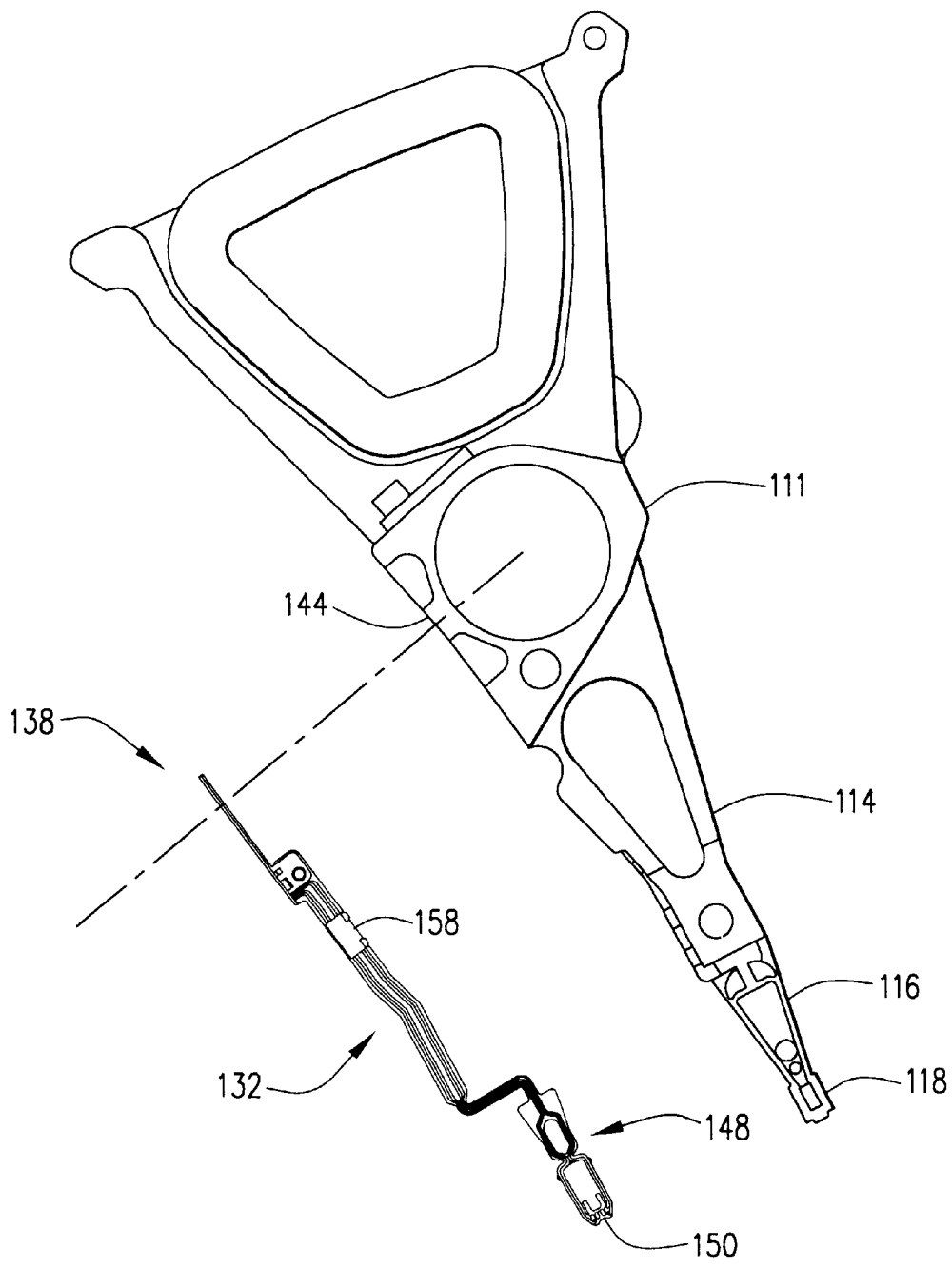
FIG. 3 is a partially exploded plan view of a portion of the actuator assembly of FIG. 1.

Referring to FIGS. 2 and 3, a proximal end 138 of the interconnect 132 is foldable along a fold line 140 in order to align an opening 142 with a receptacle 144 defined by the upstanding portion of the e-block 111. A fastener (not shown) thereby fixes the proximal end 138 to the e-block 111, whereat the interconnect 132 is electrically connectable at a number of terminals 146. A distal end 148 is fixable to the arm 114 and electrically connectable to the head 118 at a number of terminals 150. In an illustrative embodiment the interconnect 132 is sandwiched between the arm 114 and the flexure 116 and constrained therebetween by the swaging operation that is typically used for fixing the flexure 116 to the arm 114. The interconnect 132 further comprises a medial portion 151 electrically connecting the ends 132, 148.

Figure 4:
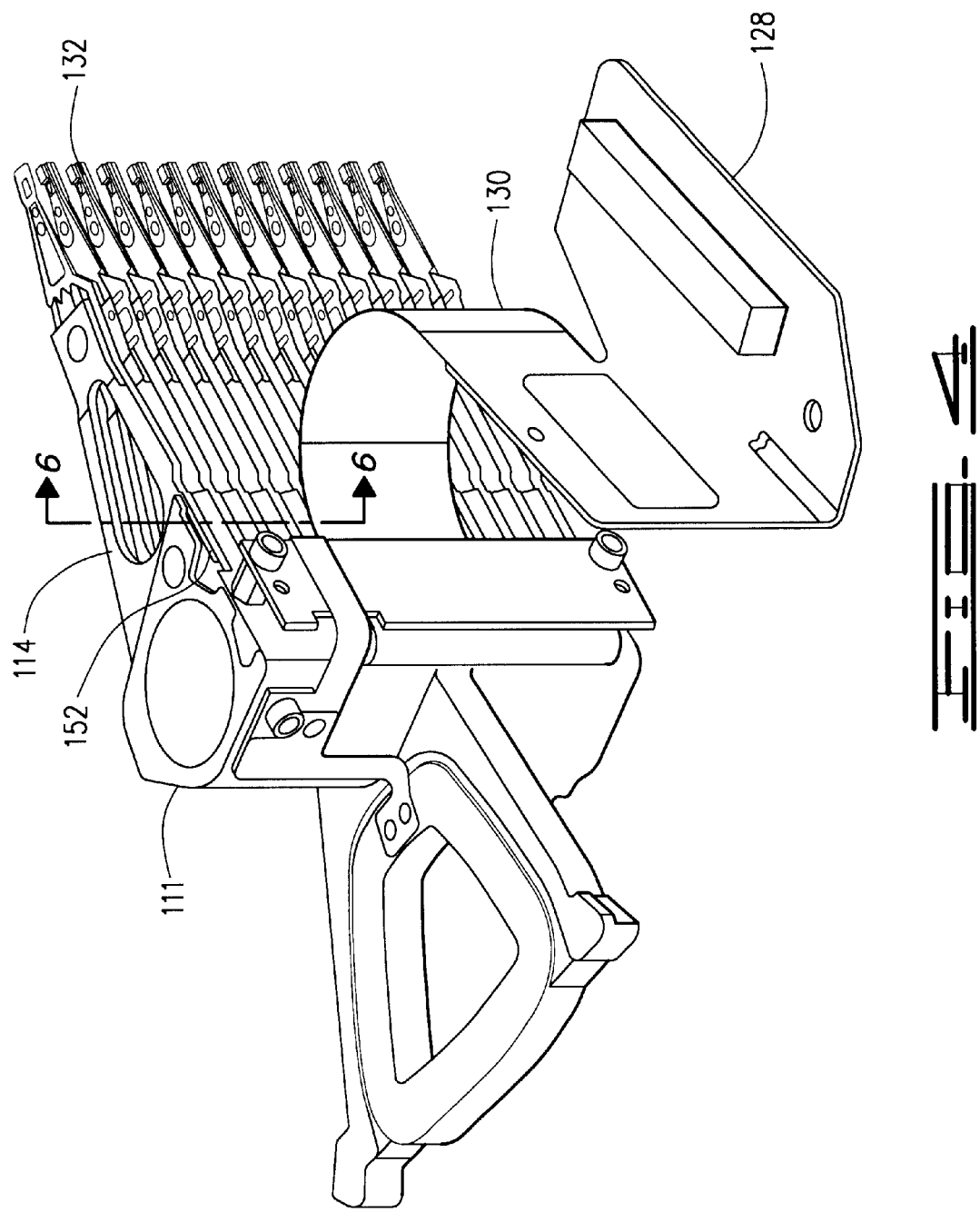
FIG. 4 is an isometric view of the actuator assembly FIG. 1.

FIG. 4 illustrates the manner in which a longitudinal opening 152 can be defined in the e-block 111 that is aligned with the respective arm 114 and thereby associated with the placement of the interconnect 132. The interconnect 132 is constrained at both ends, as described above, with a segment of the medial portion 151 (FIG. 2) disposed within the opening 152 for supporting engagement thereof.

Figure 5:
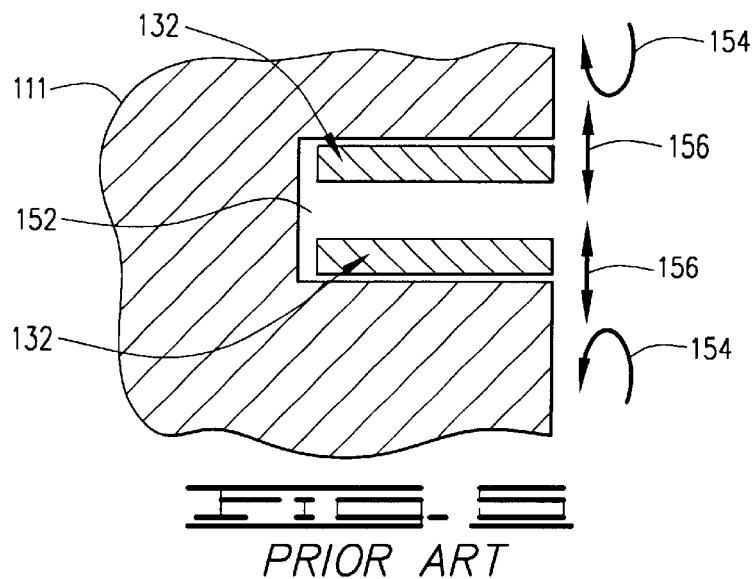
FIG. 5 is a partial cross-sectional view of an e-block opening in a prior art construction wherein the interconnects are loosely constrained at the medial portion thereof.

FIG. 5 is a partial cross-sectional view of a prior art construction showing the opening 152 in the e-block 111 with a pair of adjacent interconnects 132 passing therethrough. Typically, the interconnects 132 are rigidly constrained at both ends, as described above, but loosely constrained at the medial portion 151 within the opening 152. Circular eddy currents 154 that form in the airflow downstream of the e-block 111 can impart forces that displace the interconnect 132 in directions indicated by 156 within the opening 152. Such forces can create vibrations impacting the positioning and control of the actuator assembly 110, causing nonrepeatable runout errors during data reading and writing procedures.

Returning now to FIGS. 2 and 3, the interconnect 132 cooperates with a retaining member that is interposable between the medial portion 151 and the e-block 111 within the opening 152, fixing the medial portion 151 to the e-block 111 without using a bonding material, such as an adhesive or an epoxy. In the illustrative embodiment of FIGS. 2 and 3 the retaining member comprises a feature of the interconnect 132, such as a tab 158 that is juxtaposed adjacent the medial portion 151 and operably foldable toward the medial portion 151. Alternatively, the retaining member can be separate from the interconnect 132. FIG. 2 shows the tab 158 in the unfolded state, and FIG. 3 shows the tab in the folded state.

Figure 6:
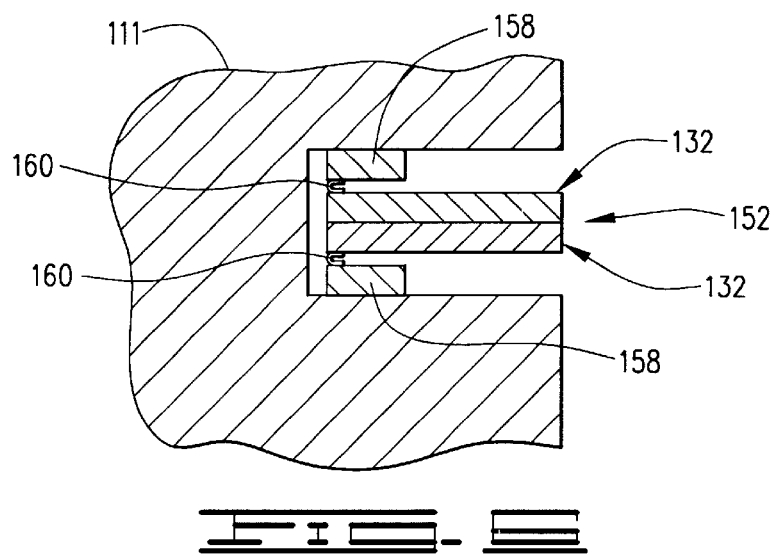
FIG. 6 is a partial cross-sectional view taken generally along a portion of the section line 6—6 in FIG. 4.

The retaining member is characterized by a member and/or feature that defines a resilient compressible member insertable into the opening 152 in the e-block 111 to fix the interconnect 132 therein. For example, FIG. 6 illustrates upper and lower interconnects 132, each with a folded tab 158 defining a member wedgingly engageable within the opening 152. The compressible characteristic of the retaining member urges the interconnects 132 against opposing extents of the opening 152 so as to fix the medial portion 151.

Figure 7:
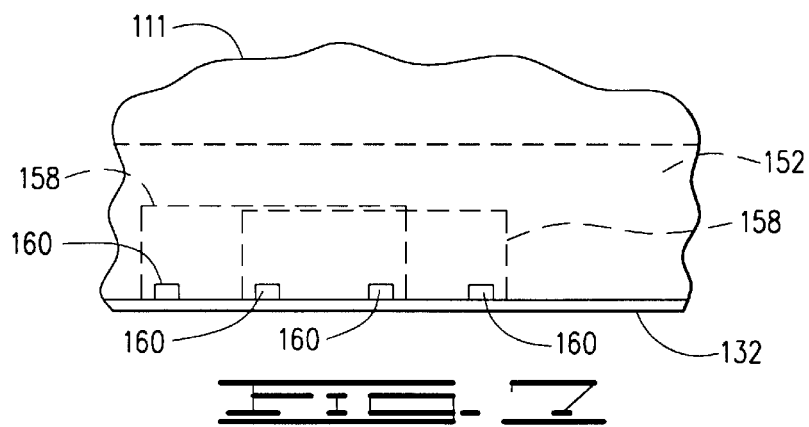
FIG. 7 is a diagrammatic top view of a portion of the actuator assembly illustrating the tabs disposed so as to be longitudinally staggered.

FIG. 7 is a diagrammatic top view of the e-block 111 with the pair of interconnects 132 (only the top interconnect 132 shown) passing through the opening 152. It will be noted that preferably the tabs 158 are longitudinally staggered so as to not overlap each other in wedgingly engaging the interconnect 132 within the opening 152. It will be further noted from FIGS. 6 and 7 that in an illustrative embodiment the tabs 158 are both folded so as to be receivingly engageable between the interconnects 132.

Figure 8:
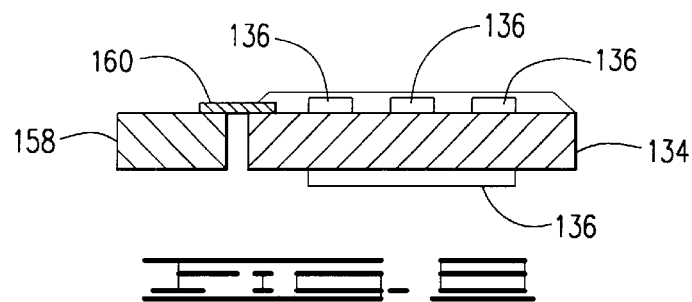
FIG. 8 is a cross-sectional view of an illustrative interconnect apparatus constructed in accordance with the embodiments of the present invention wherein the tab is connected at one edge to the interconnect medial portion.
Figure 9:
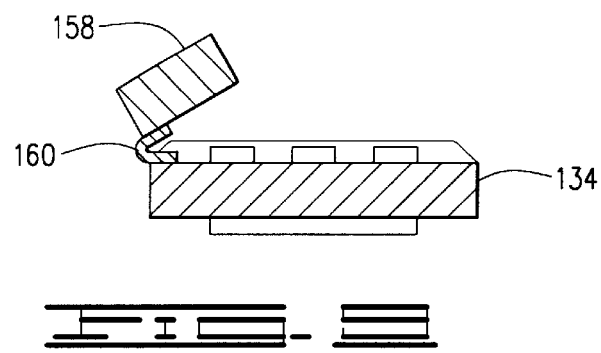
FIG. 9 is a cross-sectional view of the interconnect apparatus of FIG. 7 illustrating the tab in the folded state.
Figure 10:
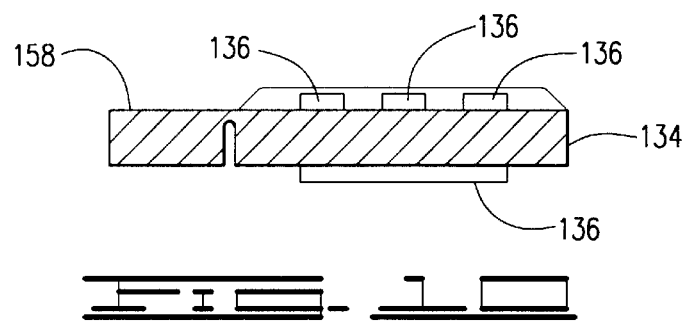
FIG. 10 is a cross-sectional view of an illustrative interconnect apparatus constructed in accordance with the embodiments of the present invention wherein the tab is unitarily formed as a portion of the interconnect medial portion.
Figure 11:
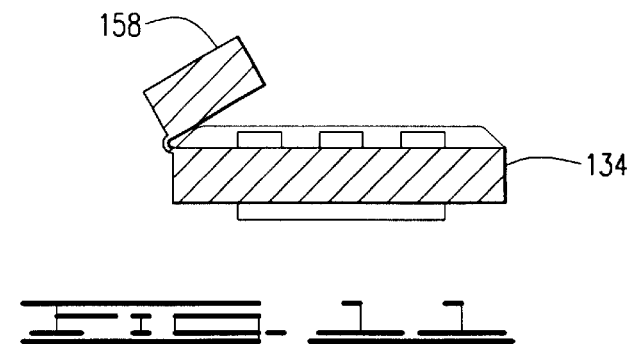
FIG. 11 is a cross-sectional view of the interconnect apparatus of FIG. 9 illustrating the tab in the folded state.

In one illustrative embodiment the tab 158 can be attached at one edge to the medial portion 151 of the interconnect 132. FIGS. 8 and 9, for example, illustrate an interconnect 132 construction within the contemplated embodiments of the present invention. A support member 160 is joined to both the dielectric material 136 and the tab 158. In one alternative illustrative embodiment the tab 158 can be unitarily formed as a portion of the interconnect 132. FIGS. 9 and 10, for example, illustrate another interconnect 132 construction within the contemplated embodiments of the present invention wherein the tab 158 is defined as a portion of the dielectric material 134. Alternatively, the tab 158 can be separate from the interconnect 132.

In summary, the embodiments of the present invention contemplate an interconnect apparatus (such as 132) for connecting a transducer (such as 118) to a flexible connector (such as 130) in an actuator assembly (such as 110) of a data storage device (such as 100). The actuator assembly has a moveable actuator body (such as 111) and an arm (such as 114) extending from the body, the body defining a longitudinal opening (such as 152) aligned with the arm and associated with the placement of the interconnect apparatus.

The interconnect apparatus comprises a proximal end (such as 138) fixable to the actuator body and electrically connectable to the flexible connector; a distal end (such as 148) fixable to the arm and electrically connectable to the transducer; a medial portion (such as 151) electrically connecting the ends, a segment of the medial portion disposable within the actuator body opening; and a retaining member (such as 158) interposable between the medial portion and the actuator body within the opening, fixing the medial portion to the actuator body without using a bonding material.

In one illustrative embodiment the retaining member comprises a tab juxtaposed adjacent the medial portion and operably foldable toward the medial portion. The folded tab and medial portion cooperatively define a cross-sectional shape characterized by a resilient compressible member receivingly engageable within the opening. Preferably, the folded tab and medial portion define a compressible member wedgingly engageable within the opening.

In one illustrative embodiment the actuator assembly has two arms extending from the actuator body, wherein a first interconnect apparatus is attachable to one of the arms and a second interconnect apparatus is attachable to the other arm, both interconnect apparatuses passing through the same opening in the actuator body, wherein the respective tabs are clearingly longitudinally staggered. Accordingly, each of the tabs can be receivingly engageable between the interconnect apparatuses.

In one illustrative embodiment the tab can be attached at one edge to the interconnect apparatus medial portion; alternatively, the tab can be unitarily formed as a portion of the interconnect apparatus.

In one aspect of the embodiments of the present invention an actuator assembly for a data storage device is contemplated. The actuator assembly comprises a moveable actuator body comprising an arm extending from the body; a transducer supported by the arm to read data from and write data to a data storage medium of the data storage device; a flexible connector connecting a printed circuit board of the data storage device and contact terminals supported by the actuator body; and an interconnect apparatus electrically connecting the transducer and the flexible connector, wherein the actuator body defines a longitudinal opening aligned with the arm and the flexure and associated with the placement of the interconnect apparatus.

Accordingly, the interconnect apparatus comprises a proximal end fixed to the actuator body and electrically connected to the flexible connector; a distal end fixed to the arm and electrically connected to the transducer; a medial portion electrically connecting the ends, a segment of the medial portion disposed within the actuator body opening; and a retaining member interposed between the medial portion and the actuator body within the opening, fixing the medial portion to the actuator body without using a bonding material.

In one aspect of the embodiments of the present invention a data storage device is contemplated, comprising an actuator assembly operably coupled with a data storage medium in a data reading and writing relationship; and means for reducing vibration by fixing a medial portion of an electrical interconnect to the actuator assembly without using a bonding material.

For purposes of the present description, as explicitly and implicitly described in the illustrative embodiments and illustrated in the exemplary embodiments set forth in the drawings, the means for reducing vibration contemplates other equivalent embodiments where the interconnect apparatus has a retaining member and/or retaining feature that is engageable against the actuator body, fixing the medial portion of the interconnect without the use of a bonding material such as, but not limited to, an adhesive or an epoxy. Accordingly, the means for reducing vibration expressly does not contemplate prior art approaches involving the use of a bonding material, or where the medial portion of the interconnect has freedom of movement to vibrate.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the size and folding orientation of the interconnect may vary while maintaining substantially the same functionality without departing from the scope and spirit of the present invention. In addition, although the preferred embodiment described herein is directed to a data storage device, it will be appreciated by those skilled in the art that the teachings of the present invention can be applied to other systems, like data storage test or certification systems, servo track writers, optical data storage systems, or any other assembled product which can be automatically assembled, without departing from the scope and spirit of the present invention.

What is claimed is:

1. An interconnect apparatus for connecting a transducer to a flexible connector in an actuator assembly of a data storage device, the actuator assembly having a moveable actuator body and an arm extending from the body, the body defining a longitudinal opening aligned with the arm and associated with the placement of the interconnect apparatus, comprising:
   a proximal end fixable to the actuator body and electrically connectable to the flexible connector;
   a distal end fixable to the arm and electrically connectable to the transducer;
   a medial portion electrically connecting the ends, a segment of the medial portion disposable within the actuator body opening; and
   a retaining member interposable between the medial portion and the actuator body within the opening, adapted for fixedly retaining the medial portion within the opening of the actuator body without using a bonding material, in order to prevent vibration of the interconnect apparatus.

2. The apparatus of claim 1 wherein the retaining member comprises a tab juxtaposed adjacent the medial portion and operably foldable toward the medial portion.

3. The apparatus of claim 2 wherein the folded tab and medial portion define a cross-sectional shape characterized by a resilient compressible member receivingly engageable within the opening.

4. The apparatus of claim 3 wherein the folded tab and medial portion define a compressible member wedgingly engageable within the opening.

5. The apparatus of claim 2 wherein the actuator assembly has two arms extending from the actuator body, wherein a first interconnect apparatus is attachable to one of the arms and a second interconnect apparatus is attachable to the other arm, both interconnect apparatuses passing through the same opening in the actuator body, wherein the respective tabs are clearingly longitudinally staggered.

6. The apparatus of claim 5 wherein each of the tabs is receivingly engageable between the interconnect apparatuses.

7. The apparatus of claim 2 wherein the tab is attached at one edge to the interconnect apparatus medial portion.

8. The apparatus of claim 2 wherein the tab is unitarily formed as a portion of the interconnect apparatus.

9. An actuator assembly for a data storage device, comprising:
   a moveable actuator body comprising an arm extending from the body;
   a transducer supported by the arm to read data from and write data to a data storage medium of the data storage device;
   a flexible connector connecting a printed circuit board of the data storage device and contact terminals supported by the actuator body; and
   an interconnect apparatus electrically connecting the transducer and the flexible connector, wherein the actuator body defines a longitudinal opening aligned with the arm and associated with the placement of the interconnect apparatus, the interconnect apparatus comprising:
      a proximal end fixed to the actuator body and electrically connected to the flexible connector;
      a distal end fixed to the arm and electrically connected to the transducer;
      a medial portion electrically connecting the ends, a segment of the medial portion disposed within the actuator body opening; and
      a retaining member interposed between the medial portion and the actuator body within the opening, fixedly retaining the medial portion within the actuator body without using a bonding material, in order to prevent vibration of the interconnect apparatus.

10. The assembly of claim 9 wherein the retaining member comprises a tab juxtaposed adjacent the medial portion and operably foldable toward the medial portion.

11. The assembly of claim 10 wherein the folded tab and medial portion define a cross-sectional shape characterized by a resilient compressible member receivingly engaged within the opening.

12. The assembly of claim 10 wherein the actuator assembly has two arms extending from the actuator body, wherein a first interconnect apparatus is attached to one of the arms and a second interconnect apparatus is attached to the other arm, both interconnect apparatuses passing through the same actuator body opening, wherein the respective tabs are clearingly longitudinally staggered.

13. The assembly of claim 12 wherein each of the tabs is receivingly engaged between the interconnect apparatuses.

14. The assembly of claim 10 wherein the tab is attached at one edge to the interconnect apparatus medial portion.

15. The assembly of claim 10 wherein the tab is unitarily formed as a portion of the interconnect apparatus.

16. A data storage device, comprising:
   an actuator assembly including an actuator body operably coupled an actuator body, coupled with a data storage medium in a data reading and writing relationship; and means for reducing vibration by fixing a medial portion of an electrical interconnect to the actuator assembly without using a bonding material.

17. The data storage device of claim 16 wherein the actuator body defines a longitudinal opening associated with the placement of the electrical interconnect, and wherein the means for reducing vibration is characterized by a retaining member wedgingly interposed between the medial portion and the actuator body within the opening, fixing the medial portion to the actuator body.

18. The data storage device of claim 17 wherein the means for reducing vibration is characterized by a retaining member comprising a tab juxtaposed adjacent the medial portion and operably foldable toward the medial portion.

19. The data storage device of claim 18 wherein the means for reducing vibration is characterized such that the folded tab and medial portion define a cross-sectional shape defining a resilient compressible member receivingly engaged within the opening.

20. The data storage device of claim 18 wherein the actuator assembly has two arms extending from the actuator body, wherein a first electrical interconnect is attached to one of the arms and a second electrical interconnect is attached to the other arm, both interconnect apparatuses passing through the same actuator body opening, wherein the means for reducing vibration is characterized such that the respective tabs are clearingly longitudinally staggered.

21. The data storage device of claim 20 wherein the means for reducing vibration is characterized such that each of the tabs is receivingly engaged between the interconnect apparatuses.

22. The data storage device of claim 21 wherein the means for reducing vibration is characterized such that the tab is attached at one edge to the interconnect apparatus medial portion.

23. The data storage device of claim 21 wherein the means for reducing vibration is characterized such that the tab is unitarily formed as a portion of the interconnect apparatus.

* * * * *